United States Patent Office 2,725,335
Patented Nov. 29, 1955

2,725,335

CHLOROAMIDE CONTAINING CAMOUFLAGE OINTMENT

Wilbur A. Lazier, Birmingham, Ala., William J. Peppel, Lodi, N. J., and Paul L. Salzberg, Carrcroft, Del., assignors, by mesne assignments, to the United States of America as represented by the Secretary of War No Drawing. Application November 2, 1945, Serial No. 626,442

8 Claims. (Cl. 167—63)

This invention relates to therapeutic compositions, and more particularly to improved N-chloroamide ointments.

Ointments composed of an N-chloroamide, a liquid vehicle, a thickener, and a filler have been proposed heretofore for application to the skin as a protective layer against vapors of chemical warfare vesicants, such as mustard gas. The best of these contain titanium dioxide, a material which imparts to the ointment the desired spreading and other physical characteristics. While these chloroamide-titanium dioxide ointments afford adequate protection against mustard vapor and have no irritating effect on repeated application to the skin, the titanium dioxide renders readily visible any exposed skin areas coated with the ointment with the result that it is not suitable for use under warfare conditions where troops must often be camouflaged to prevent detection by the enemy. Tests with a large number of coloring materials have shown that the solution to this problem is not found in simply including in the ointment any desired pigment or pigment dye which will blend with the expected terrain; thus, the pigments commonly used under such circumstances for imparting an olive drab color to ordinary ointments are unsatisfactory for coloring mustard-protective ointments because of either their reactivity with the N-chloroamide used in such ointments, their toxicity, or their low tinctorial strength. The chemical reactivity between the pigment and the N-chloroamide results either in a rapid change in the color or shade of the pigment, or in the rapid decomposition of the N-chloroamide, or in both, with the result that the ointments containing such pigments are unsuitable from the standpoints of mustard-protection or camouflage.

It is an object of this invention, therefore, to provide a mustard-protective ointment having a color suitable for its use for camouflage purposes. It is a further object to provide such an ointment which does not irritate the skin on repeated applications, and which is stable for practical periods of time. Still other objects will appear hereinafter.

These objects are accomplished by the present invention of a mustard-protective ointment, useful also for purposes of camouflage, which comprises an N-chloroamide, a liquid vehicle, a thickening agent soluble in the vehicle, a filler insoluble in the vehicle, and, as the camouflage pigment-dye, a mixture of 2,1-dinaphthioindigo with a polychloro copper phthalocyanine containing 14 to 16 atoms of chlorine.

In preparing the mustard-protective camouflage ointments of this invention, the thickener is first dissolved in the liquid vehicle, the thickened vehicle then added to the dry N-chloroamide and filler, and the mixture subjected to mechanical mixing in a roller or ball mill to develop the full undertone of the filler. A dry mixture of the polychloro copper phthalocyanine and naphthioindigo, in the proportions necessary to give the desired color and shade, is then added to the white ointment and the composition milled until the full tinctorial strength of the phthalocyanine is developed.

This invention is illustrated in greater detail in the following examples, in which the proportions of the ingredients are expressed as parts by weight:

*Example I*

| | Parts |
|---|---|
| Triacetin (liquid vehicle) | 52.0 |
| 1,3,4,6 - tetrachloro - 2,5-diimino-3a,6a-diphenylglycoluril | 25.0 |
| Titanium dioxide (filler) | 9.5 |
| Cellulose acetate butyrate (thickener) | 3.0 |
| Magnesium stearate (thickener) | 9.0 |
| Pigment-dye (80% 2,1-dinaphthioindigo, 20% polychloro copper phthalocyanine) | 1.5 |

A mustard-protective ointment having the particular shade of olive green desired for camouflage purposes is prepared from the above ingredients as follows: The cellulose acetate butyrate is dissolved in the triacetin by stirring with gentle heating, and the resulting solution added to the dry N-chloroamide, titanium dioxide, and magnesium stearate. The composition obtained is mixed in a roller mill until the full undertone of the titanium dioxide is developed, after which the mixture of pigment dyes is added and milling continued until the full shade of the green pigment dye is developed. A sample of the resulting ointment, when stored in a sealed glass container at 75° C. for 7 days in the presence of an equal volume of air, loses only 4.7% of its active chlorine. This product may be applied to the skin as a mustard-protective camouflage ointment.

*Example II*

| | Parts |
|---|---|
| Triacetin (liquid vehicle) | 50.0 |
| 1,3,4,6-tetrachloro-3a,6a-dimethylglycoluril | 11.85 |
| Magnesium stearate (thickener) | 17.0 |
| Cellulose acetate butyrate (thickener) | 4.15 |
| Titanium dioxide (filler) | 14.5 |
| Pigment dye (80% 2,1-dinaphthioindigo, 20% polychloro copper phthalocyanine) | 2.5 |

A mustard-protective ointment having a shade of olive green suitable for camouflage purposes is prepared from the above ingredients in the same manner as described in Example I. The resulting ointment, when stored in sealed glass containers at 50° C. for 30 days in the presence of an equal volume of air, loses only 0.5% of its available chlorine. This composition will thus both camouflage the skin and protect it for practical periods from mustard gas.

The examples show two ointments in which the special pigment dyes are employed in proportions which give the shade of olive green desired for most camouflage purposes, the brown pigment (2,1-dinaphthioindigo) serving principally to reduce the white undertone of the titanium dioxide, and the green pigment (polychloro copper phthalocyanine) providing the greater tinting power. These proportions may, however, be varied somewhat if desired to give shades which better match different kinds of terrain; thus, if the proportion of polychloro copper phthalocyanine be reduced from 20% of the total to 10% or 15%, the color is changed to a gray-brown. If a somewhat more yellow color is desired, this can be obtained by incorporating a small amount of the pigment dye 1,5-di(benzoylamino)anthraquinone (Colour Index No. 1132); thus, if the pigment dye mixture of Example II be replaced by a mixture of 39% 1,5-di(benzoylamino)-anthraquinone, 39% of 2,1-dinaphthioindigo, and 22% of polychloro copper phthalocyanine, an ointment having a light yellow-olive color is obtained. The proportions of the combined pigment dye mixture, i. e., in relation to the other components of the ointment, may vary over wide limits, the preferred proportions depending principally on the amount of titanium dioxide in the ointment and the particular shade desired; thus, in general, the larger the amount of titanium dioxide, the larger will be the amount of pigment required to obtain the desired shade. To obtain the shade of olive green most commonly desired for blending with the olive drab color of uniforms, about one part of the combined pigment mixture is used for each six parts of titanium dioxide.

While the invention has been illustrated with particular reference to ointments containing two specific N-chloroamides, it is considered that other N-chloroamides, e. g., N,N' - di(2,4,6 - trichlorophenyl) - N,N' - dichlorourea, 1,3,4,6-tetrachloro-3a,6a-diphenylglycoluril, and N-chlorohydantoins such as N,N'-dichloro-5,5-dimethylhydantoin and 1,1-methylene-bis-(N-chloro-5,5-dimethylhydantoin), can be employed with similar results. Likewise, it is contemplated that other liquid vehicles, thickeners, and fillers can be used instead of those specifically illustrated in the examples.

The method of preparing the pigmented ointments which comprises milling the dry pigment mixture into the white ointment, as described in the examples, is a preferred method for producing the maximum color and for obtaining reproducible shades in the ointments of this invention. Other methods may, however, be employed. One such which gives satisfactory results involves preparing a concentrated paste by milling the special pigment dyes into the thickened liquid vehicle, and then mechanically mixing this paste with a milled white N-chloroamide ointment in the proportions necessary to produce the desired color. By way of illustration, paste suitable for this method is prepared by milling 30 parts of a mixture of 80% 2,1-dinaphthioindigo and 20% polychloro copper phthalocyanine into a solution of 3 parts of cellulose acetate butyrate in 67 parts of triacetin.

The ointments of this invention are particularly useful for application to the skin to provide protection from mustard gas vapor and, at the same time, to serve as a camouflage for the wearer.

Having thus described our invention, what we claim as new and wish to secure by Letters Patent is:

1. A therapeutic ointment comprising an N-chloroamide, a liquid vehicle, a thickening agent soluble in said vehicle, a filler insoluble in said vehicle, and a camouflage coloring material containing 2,1-dinaphthioindigo and a polychloro copper phthalocyanine having from 14 to 16 chlorine atoms.

2. A therapeutic ointment comprising an N-chloroamide, triacetin, cellulose acetate butyrate, titanium dioxide, and a camouflage coloring material containing 2,1-dinaphthioindigo and a polychloro copper phthalocyanine having from 14 to 16 chlorine atoms.

3. A therapeutic ointment in accordance with claim 2 characterized in that said titanium dioxide and coloring material are employed in the proportions of 6 parts of filler to 1 part of coloring material in parts by weight.

4. A therapeutic ointment comprising an N-chloroamide, triacetin, cellulose acetate butyrate, titanium dioxide, and a camouflage coloring material containing 2,1-dinaphthioindigo, a polychloro copper phthalocyanine having from 14 to 16 chlorine atoms and 1,5-di(benzoylamino)anthraquinone.

5. A therapeutic ointment comprising an N-chloroamide, triacetin, cellulose acetate butyrate, titanium dioxide, and a camouflage coloring material containing from 80–90 per cent 2,1-dinaphthioindigo and from 10–20 per cent of a polychloro copper phthalocyanine having from 14 to 16 chlorine atoms.

6. A therapeutic ointment comprising an N-chloroamide, triacetin, cellulose acetate butyrate, titanium dioxide, and a camouflage coloring material containing approximately 39 per cent of 2,1-dinathioindigo, approximately 39 per cent of 1,5-di(benzoylamino)anthraquinone, and approximately 22 per cent of a polychloro copper phthalocyanine having from 14 to 16 chlorine atoms.

7. A therapeutic ointment comprising in parts by weight, the following:

| | |
|---|---|
| Triacetin | 52.0 |
| 1,3,4,6 - tetrachloro - 2,5-diimino-3a,6a-diphenylglycoluril | 25.0 |
| Titanium dioxide | 9.5 |
| Cellulose acetate butyrate | 3.0 |
| Magnesium stearate | 9.0 |
| Pigment-dye, consisting of substantially 80% of 2,1-dinaphthioindigo and substantially 20% of polychloro copper phthalocyanine | 1.5 |

8. A therapeutic ointment comprising, in parts by weight, the following:

| | |
|---|---|
| Triaectin | 50.0 |
| 1,3,4,6 - tetrachloro - 3a,6a-dimethyl-glycoluril | 11.85 |
| Magnesium stearate | 17.00 |
| Cellulose acetate butyrate | 4.15 |
| Titanium dioxide | 14.50 |
| Pigment-dye, consisting of substantially 80% of 2,1-dinaphthioindigo and substantially 20% of polychloro copper phthalocyanine | 2.50 |

References Cited in the file of this patent

UNITED STATES PATENTS

| | | |
|---|---|---|
| 1,676,309 | Wright | July 10, 1928 |
| 1,947,568 | Noonan | Feb. 20, 1934 |
| 2,154,822 | Quisling | Apr. 18, 1939 |
| 2,214,469 | Linstead et al. | Sept. 10, 1940 |
| 2,221,139 | Hiatt | Nov. 12, 1940 |
| 2,394,887 | Berl | Feb. 12, 1946 |

OTHER REFERENCES

Milton: Advertisement in British Medical Journal, Jan. 17, 1942, page 22. (Copy in Div. 43.)

Face Camouflage: Manufacturing Chemist and Manufacturing Perfumer, Sept. 1943, XIV. 9, page 277. (Copy in Div. 43.)

Fauley: U. S. Naval Medical Bulletin, Aug. 1944, vol. 43, No. 2, pp. 209–215, pp. 213 and 214 relied upon. (Copy in Div. 43.)

Schwartz: J. A. M. A., May 15, 1943, pp. 160–161. (Copy in Div. 43.)

Martindale: The Extra Pharmacopoeia, vol. II, page 1024, 21st ed., 1943. (Copy in Div. 43.)

Matthews: Application of Dyestuffs, 1920, John Wiley & Sons Inc., N. Y., page 406. (Copy in Div. 43.)